United States Patent
Chen et al.

(10) Patent No.: US 6,956,736 B2
(45) Date of Patent: Oct. 18, 2005

(54) FIXING DEVICE FOR ANTENNA

(75) Inventors: Hsuan-Tsung Chen, Tu-Chen (TW);
Ying Sin William Tin, Shenzhen (CN);
Pin-Shian Wu, Tu-Chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/949,100

(22) Filed: Sep. 24, 2004

(65) Prior Publication Data

US 2005/0094363 A1 May 5, 2005

(30) Foreign Application Priority Data

Oct. 31, 2003 (TW) .............................. 92219407 U

(51) Int. Cl.⁷ ................................................ G06F 1/16
(52) U.S. Cl. ..................... 361/683; 343/703; 343/720; 312/223.1; 312/223.2
(58) Field of Search ................................ 361/679–686; 312/223.1, 223.2, 333; 248/685–689, 693, 248/121, 127, 130, 134, 510; 343/878, 880–882, 343/892

(56) References Cited

U.S. PATENT DOCUMENTS

| | | | |
|---|---|---|---|
| 6,084,180 A * | 7/2000 | DeBartolo et al. ............. 174/95 |
| 6,119,138 A * | 9/2000 | Pinckney et al. ............ 708/109 |
| 6,222,501 B1 * | 4/2001 | Yajima et al. ............... 343/878 |
| 6,473,043 B1 * | 10/2002 | Hwang ........................ 343/702 |
| 6,513,289 B1 * | 2/2003 | Decore et al. ............. 52/288.1 |
| 6,587,349 B1 * | 7/2003 | Chen .......................... 361/752 |
| 6,650,532 B2 * | 11/2003 | Shin ............................ 361/683 |
| 6,833,817 B2 * | 12/2004 | Olsen .......................... 343/702 |
| 2003/0076266 A1 * | 4/2003 | Schaffer ..................... 343/702 |

FOREIGN PATENT DOCUMENTS

| | | |
|---|---|---|
| TW | 87211419 | 4/2002 |
| TW | 91221684 | 3/2004 |

\* cited by examiner

Primary Examiner—Lynn Feild
Assistant Examiner—Anthony Q. Edwards
(74) Attorney, Agent, or Firm—Wei Te Chung

(57) ABSTRACT

A fixing device (20) for securing an antenna (10) to a front panel (60) of a computer enclosure (80), includes a main body (22), two fixing arms (24) extending from opposite ends of the main body, and two locking arms (30) extending from the main body and perpendicular to the fixing arms. Two position posts (23) and two pairs of hooks (42) are formed from the main body and engage in corresponding position holes (62) and mounting holes (64) of the panel. Two aligned slots (26) are defined in the fixing arms for receiving the antenna. Each locking arm includes a connecting portion (32) and a bent portion (34). Each locking arm can rotate around a rotation section (31) of the connecting portion, and a locking hole (38) of the bent portion can engage with a locking block (28) of the fixing arm thereby securing the antenna in the slots.

18 Claims, 4 Drawing Sheets

FIXING DEVICE FOR ANTENNA

BACKGROUND OF THE INVENTION

1. Field of the Invention

The present invention relates to fixing devices for antennas, and particularly to a fixing device which readily secures an antenna of wireless peripheral devices in a computer enclosure and allows convenient removal of the antenna therefrom.

2. Description of the Related Art

Generally speaking, computer peripherals such as keyboards and mouses are connected to computers via cables. However, the cables limit the moving space of the peripherals. Additionally, the cables are readily disengaged from the computer when the peripherals are hit or moved improperly.

It is also known to use wireless keyboards and wireless mouses, which is shown in Taiwan patent application No. 87211419. The wireless keyboard transmits data to a signal-receiving antenna via a wireless device. The antenna then transmits the data to the computer. The keyboard has no cable limitation. However, the antenna is independently placed outside the computer, for example, on a computer desk, and is connected to the computer via a cable. The space outside the computer will become more crowded. The antenna will take a risk of disconnecting from the computer when the cable is incautiously hit or pulled. Furthermore, the antenna is relative large, unwieldy, aesthetically unpleasing and it takes extra space in transport.

In order to solve the above problems, an improved antenna is now attached to a computer. A fixing device is used to secure the antenna to the computer.

BRIEF SUMMARY OF THE INVENTION

Accordingly, an object of the present of invention is to provide a fixing device which readily secures an antenna to a computer and which allows ready detachment therefrom.

Another object of the present of invention is to provide an antenna fixing device which has a simple configuration.

To achieve the above-mentioned object, a fixing device of a preferred embodiment of the present invention for securing an antenna to a front panel of a computer enclosure, comprises an elongated main body, two fixing arms extending from opposite ends of the main body, and two locking arms extending from the main body and perpendicular to the fixing arms. Two position posts and two pairs of hooks are formed from the main body, and engage in corresponding position holes and mounting holes of the panel. Two aligned slots are defined in the fixing arms for receiving the antenna. Each locking arm comprises a connecting portion and a bent portion. Each locking arm can rotate around a rotation section of the connecting portion, and a locking hole of the bent portion can engage with a locking block of the fixing arm thereby securing the antenna in the slots.

Other objects, advantages and novel features of the present invention will be drawn from the following detailed description of the preferred embodiments of the present invention with the attached drawings, in which:

DETAILED DESCRIPTION OF THE INVENTION

Figure 1:
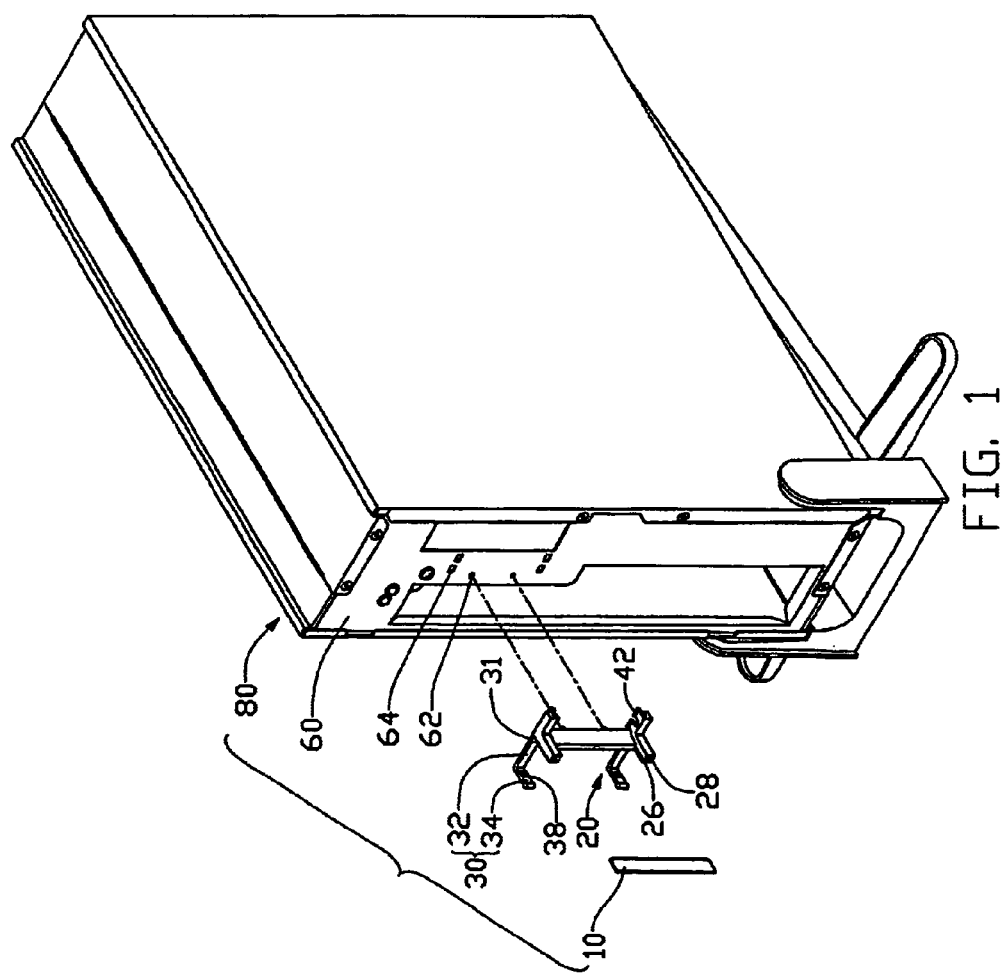
FIG. 1 is an exploded, isometric view of a fixing device in accordance with the preferred embodiment of the present invention, together with an antenna and a computer enclosure.

Referring to FIG. 1, an antenna fixing device 20 in accordance with the preferred embodiment of the present invention is used to secure an antenna 10 of wireless computer input peripherals (not shown) to a computer enclosure 80. In this embodiment, the antenna 10 is secured to a front panel 60 of the computer enclosure 80. The antenna 10 is a rectangular sheet.

Figure 2:
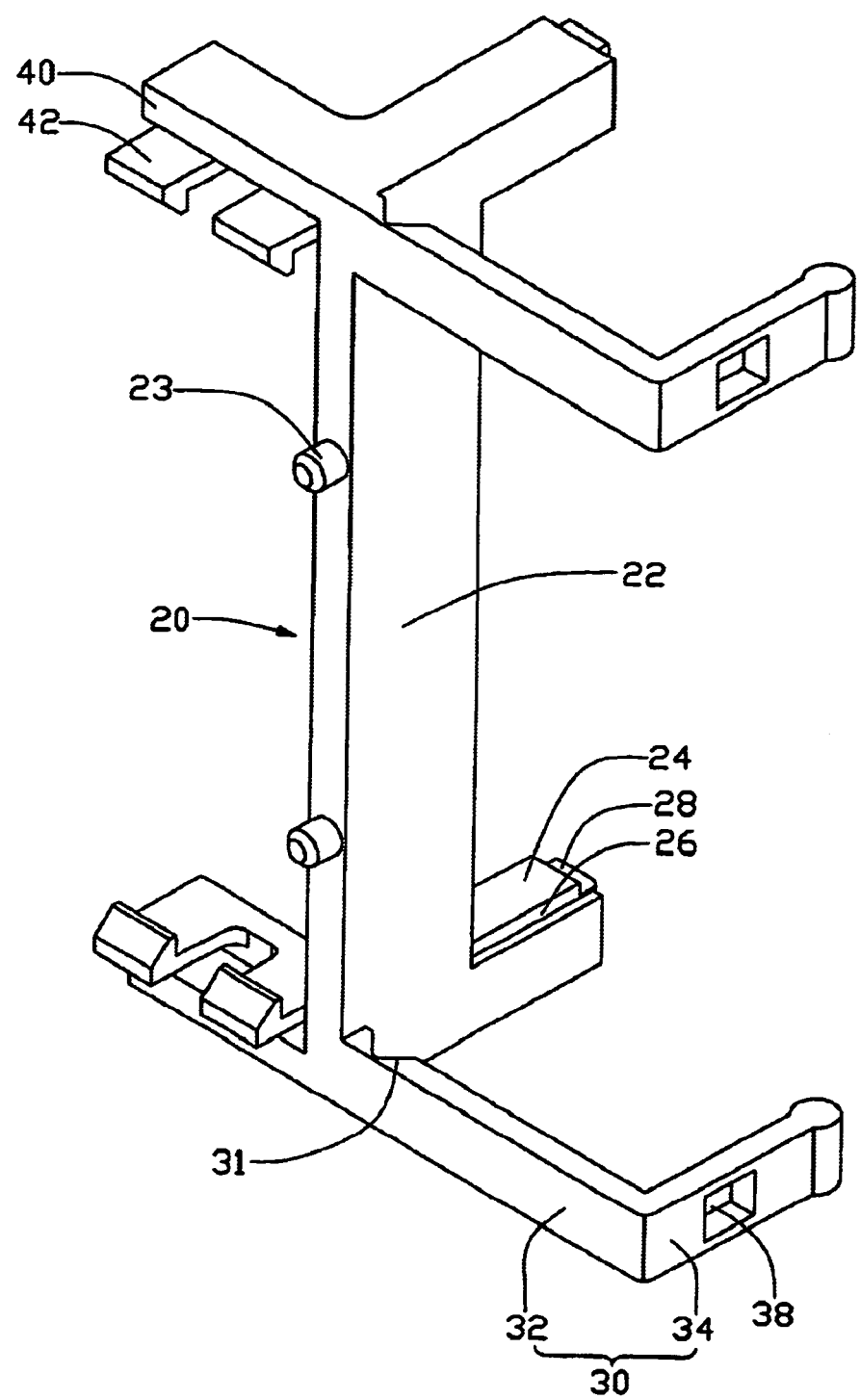
FIG. 2 is an enlarged view of the fixing device of FIG. 1.

Referring also to FIG. 2, the fixing device 20 is integrally formed of plastic material which has good flexibility. The fixing device 20 comprises an elongated main body 22, a pair of positioning posts 23 formed from one side of the main body 22 which faces the front panel 60, and a pair of fixing arms 24 extending from opposite ends of the other side of the main body 22. A locking slot 26 is defined in each fixing arm 24 with a depth thereof substantially equal to a width of the antenna 10. A locking block 28 is formed on a distal end of each fixing arm 24. A pair of L-shaped locking arms 30 extends perpendicularly from opposite ends of the main body 22 in a same direction. Each locking arm 30 comprises a connecting portion 32, and a bent portion 34 extending perpendicularly from an end of the connecting portion 32. The connecting portion 32 has a rotation section 31 in the vicinity of the main body 22, which is a V-shaped notch. A rectangular locking hole 38 is defined in the bent portion 34 corresponding to the locking block 28 of the fixing arm 24. A pair of engaging portions 40 extends from opposite ends of the main body 22 in an opposite direction relative to the locking arms 30. A pair of hooks 42 is formed from each engaging portion 40 toward the front panel 60.

The front panel 60 defines a pair of position holes 62 corresponding to the position posts 23, and two pairs of mounting holes 64 corresponding to the hooks 42.

Figure 3:
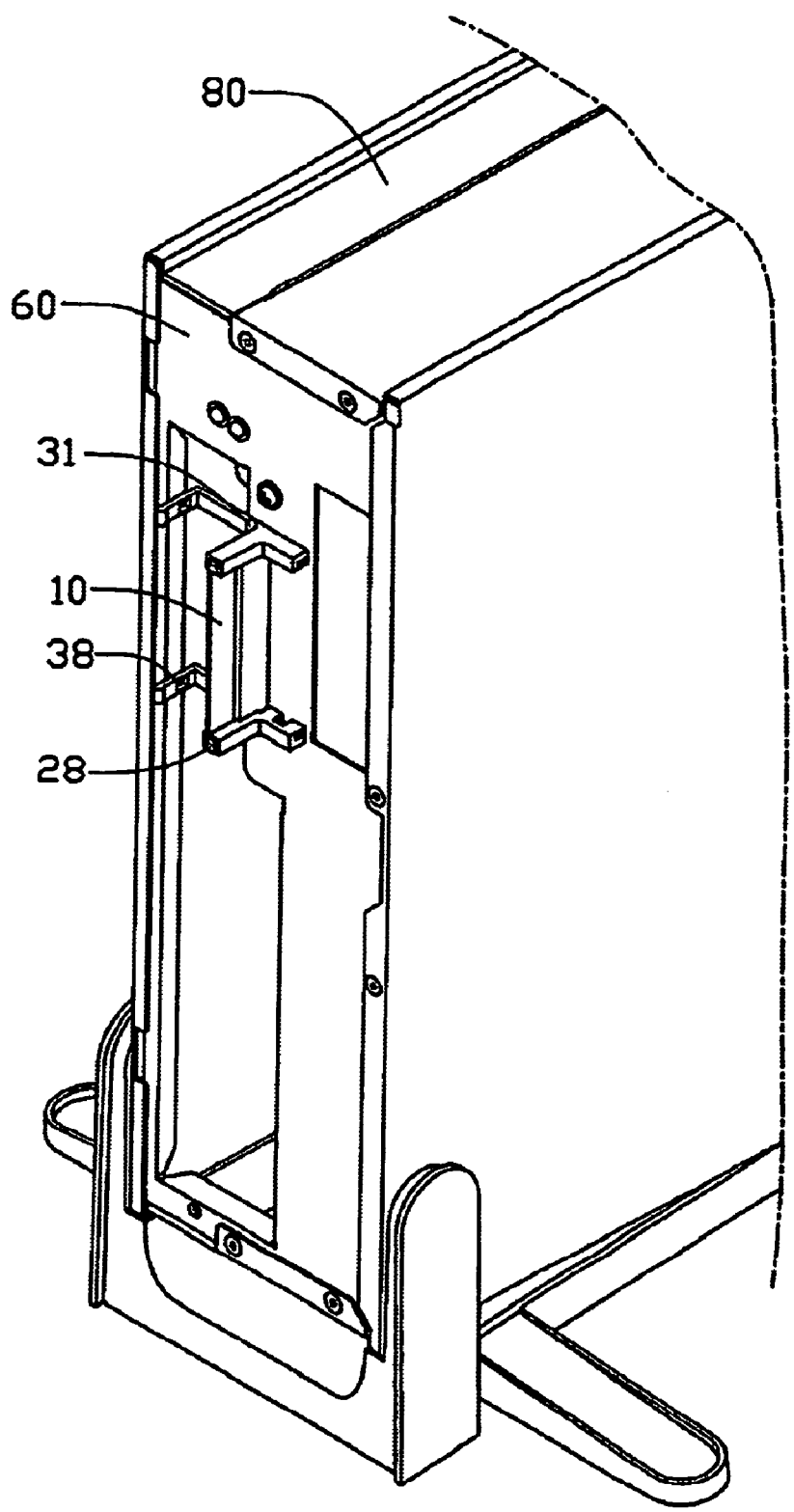
FIG. 3 is an assembled view of FIG. 1, showing the fixing device in an unlocking state.
Figure 4:
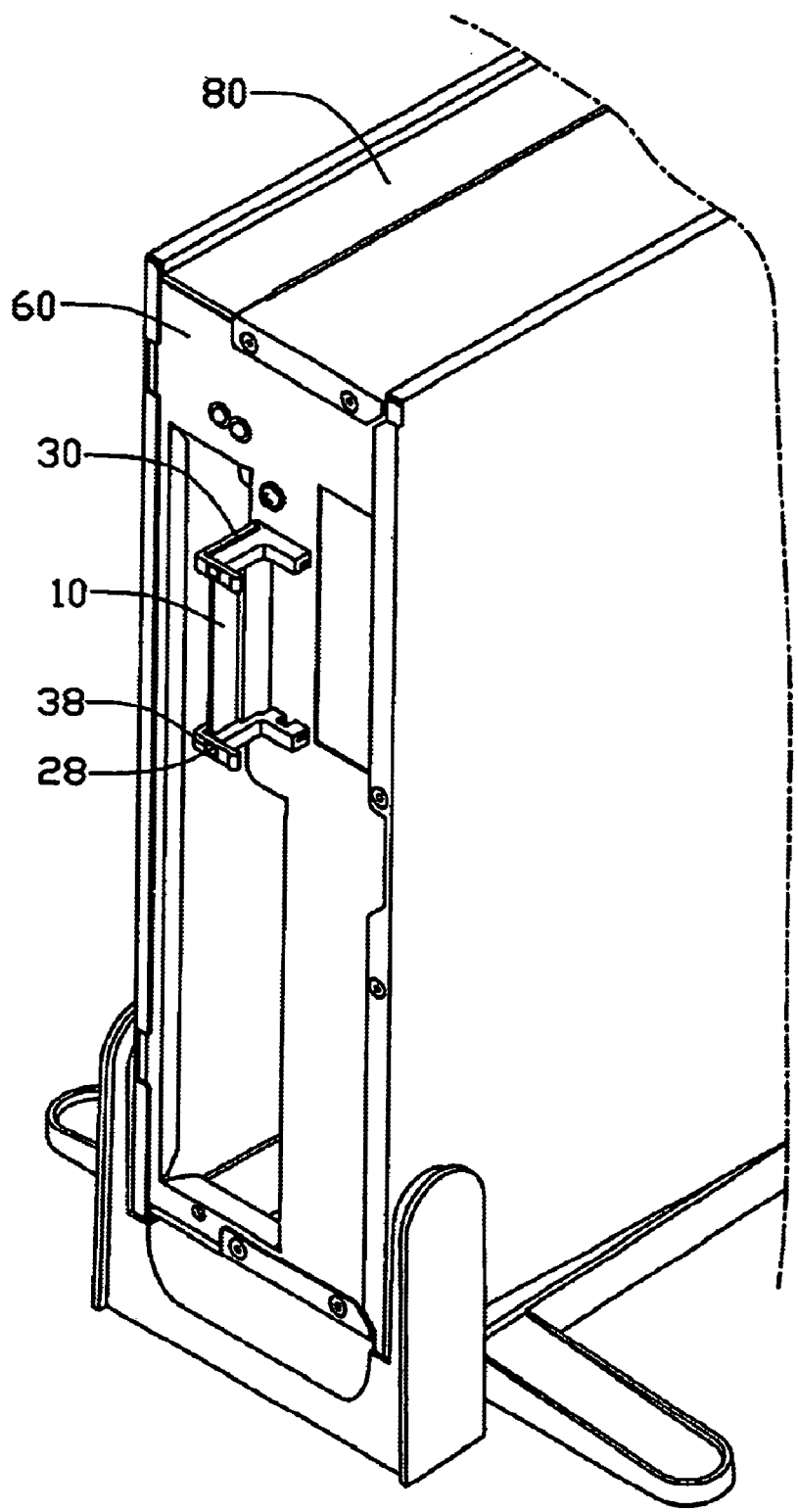
FIG. 4 is similar to FIG. 3, but showing the fixing device in a locking state.

Referring also to FIGS. 3 and 4, in assembly, the fixing device 20 is firstly attached to the front panel 60 with the position posts 23 received in the position holes 62 and the hooks 42 engagingly received in the mounting holes 64. The antenna 10 is then inserted in the locking slots 26. Rotate the locking arms 30 around the corresponding rotation sections 31 so that the locking holes 38 engage with the locking blocks 28. The antenna 10 is thereby secured in the locking slots 26 by the locking arms 30. Thus, the fixing device 20 attaches the antenna 10 to the front panel 60 of the computer enclosure 80.

In other embodiment, the locking holes 38 of the locking arms can be changed to blocks, while the locking blocks 28 of the fixing arms 24 can be changed to holes. The notch of the rotation section 31 can be a hinge structure instead.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A fixing device for securing an antenna to a panel of a computer enclosure, the fixing device comprising:

a main body having an engaging means adapted to engage with the panel of the computer enclosure;

a pair of fixing arms extending from the main body, each of the fixing arms defining a longitudinal locking slot adapted to receive the antenna therein, and forming a first locking means at an end thereof; and a pair of locking arms extending from the main body, each of the locking arms comprising a rotation section in the vicinity of the main body, and a second locking means corresponding to the first locking means; wherein the locking arms rotate around the rotation sections between an open position, and a closed position in which the second locking means engage with the first locking means so as to secure the antenna in the locking slots, wherein said antenna is essentially perpendicular to said panel.

2. The fixing device as described in claim 1, wherein the engaging means comprises a pair of hooks adapted to engage in a pair of mounting holes of the panel of the computer enclosure.

3. The fixing device as described in claim 2, wherein the engaging means further comprises at least one position post adapted to be received in a position hole of the panel of the computer enclosure.

4. The fixing device as described in claim 1, wherein the locking slots of the fixing arms are in alignment with each other, and each of the locking slots has a depth adapted to be substantially the same with a width of the antenna.

5. The fixing device as described in claim 4, wherein the first locking means is located at a side of a corresponding locking slot away from a corresponding locking arm.

6. The fixing device as described in claim 1, wherein the first locking means comprises a locking block, and the second locking means comprises a locking hole.

7. The fixing device as described in claim 1, wherein the rotation section comprises a V-shaped notch.

8. The fixing device as described in claim 1, wherein each of the locking arms comprises a connecting portion extending perpendicularly from the main body, and a bent portion extending perpendicularly from an end of the connecting portion, and wherein the rotation section is located at the connecting portion in the vicinity of the main body, the second locking means is located at the bent portion.

9. A fixing device assembly for an antenna, comprising:

an enclosure comprising a panel, the panel comprising a first engaging means; and a fixing device comprising:

a main body comprising a second engaging means engaging with the first engaging means of the panel;

a pair of fixing arms extending from the main body, the fixing arms defining slots to receive opposite sides of the antenna thereby positioning the antenna in a first direction, a first locking means formed at an end of each of the fixing arms; and a pair of locking arms extending from the main body, each of the locking arms being rotatable around a junction of said locking arm and the main body, each of the locking arms comprising a second locking means engaging with the first locking means thereby position the antenna in a second direction perpendicular to the first direction.

10. The fixing device assembly as described in claim 9, wherein the first engaging means comprises a pair of mounting holes, the second engaging means comprises a pair of hooks.

11. The fixing device assembly as described in claim 10, wherein the first engaging means further comprises at least one position hole, the second engaging means further comprises at least one position post.

12. The fixing device assembly as described in claim 9, wherein each of the slots has a depth substantially the same with a width of the antenna.

13. The fixing device assembly as described in claim 12, wherein the first locking means is located at a side of a corresponding slot which is away from a corresponding locking arm.

14. The fixing device assembly as described in claim 9, wherein the slots are perpendicular to the panel of the enclosure, the first direction is parallel with the panel of the enclosure, the second direction is perpendicular to the panel of the enclosure.

15. The fixing device assembly as described in claim 9, wherein said junction defines a V-shaped notch.

16. The fixing device assembly as described in claim 9, wherein the first locking means comprises a locking block, and the second locking means comprises a locking hole.

17. The fixing device assembly as described in claim 9, wherein each of the locking arms comprises a connecting portion extending perpendicularly from the main body, and a bent portion extending perpendicularly from an end of the connecting portion, and wherein the second locking means is located at the bent portion.

18. A fixing device assembly comprising:

a computer enclosure defining a panel with at least one opening therein;

a fixing device including:

a main body having an engaging means attachably engaged with the panel of the computer enclosure and exposed on an exterior side of the computer enclosure; and a clamping structure including a fixing arm structure cooperating with a pivotally moveable arm structure to receivably sandwich a plate-like antenna therebetween, wherein said plate-like antenna is essentially perpendicular to said panel.

* * * * *